Jan. 21, 1964
J. T. KUMMER
3,118,729
PRODUCTION OF SMALL PARTICLE SIZE CATALYTIC
GRADE, TITANIUM TRIBROMIDE OR TRICHLORIDE
Filed May 5, 1958
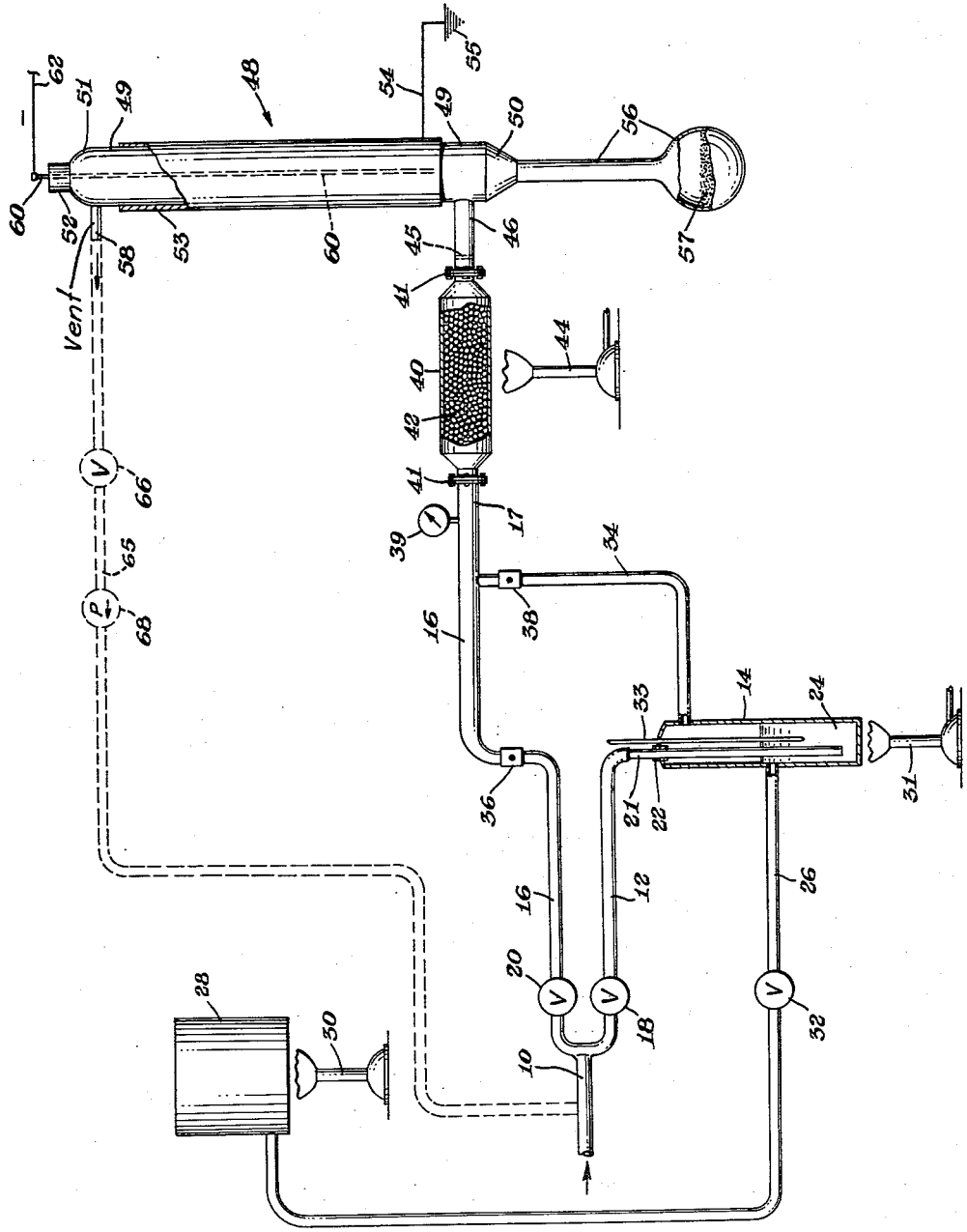
INVENTOR.
Joseph T. Kummer
BY
C.W.Carlin
ATTORNEY United States Patent Office 3,118,729
Patented Jan. 21, 1964

3,118,729
PRODUCTION OF SMALL PARTICLE SIZE, CATALYTIC GRADE, TITANIUM TRIBROMIDE OR TRICHLORIDE
Joseph T. Kummer, Midland, Mich., assignor to The Dow Chemical Company, Midland, Mich., a corporation of Delaware
Filed May 5, 1958, Ser. No. 733,180
4 Claims. (Cl. 23—87)

The invention is a method of making titanium tribromide or trichloride which is in a state of fine subdivision.

Titanium tribromide and trichloride are useful in the production of titanium metal and are of high importance both singly and in conjunction with other halide salts for catalyzing certain chemical reactions, e.g., the polymerization of olefins.

For the employment of the tribromide or trichloride of titanium advantageously as a catalyst, it is necessary that it be in a state of fine subdivision, e.g., one that provides at least about 4 square meters of surface per gram.

Known methods for the production of the tribromide and trichloride of titanium produce an average particle size which is too large for optimum results when employed as a catalyst and frequently have oxidic films or moisture thereon.

There is, accordingly, a need for an improved method of producing the tribromide and trichloride of titanium in a state of fine subdivision and substantially free of surface contamination.

The principal object of the invention, therefore, is to provide an improved method of producing such finely subdivided titanium tribromide or trichloride either singly or in conjunction with other metal halides. The attainment of this and related objects is set forth in the description of the improved method which follows hereinafter and is concisely stated in the appended claims.

The invention consists essentially of passing $TiBr_4$ or $TiCl_4$ in a steam of inert gas at a high velocity through a bed of particulated solid reducing substance consisting of one of $TiBr_2$, $TiCl_2$, aluminum, or titanium at a temperature above 500° C. and below the melting point of the $TiBr_2$, $TiCl_2$ or the metal employed to produce $TiBr_3$ or $TiCl_3$ either singly or intermixed with aluminum bromide or chloride when a metal aluminum is employed. As so produced the tribromide or trichloride vapor is carried away from the reducing substance in admixture with the inert gas. The gaseous mixture is cooled to condense the vapor and thereby form a smoke of fine particles which is carried by the inert gas mixture into a precipitator wherein the suspended tribromides and trichlorides of the smoke are precipitated. The precipitated tribromides and trichlorides drop down and are recovered in a receptacle located at the bottom of the precipitator; the inert gas and unreacted $TiBr_4$ or $TiCl_4$ are passed out through a vent provided therefor in the precipitator. It is recommended that the vented inert gas and unreacted $TiBr_4$ or $TiCl_4$ be recycled to the source of inert gas feed.

Although the invention may be carried out employing the reducing agent in any convenient size, fragments or particles of between about 1/16" and 1/2" are usually used. Fragments larger than about 1/2" result in a slow reaction and fragments smaller than about 1/16" result in a higher resistance to gas flow therethrough and an appreciable carry-over of the reducing substance into the precipitator. A sieve of high melting and unreactive material, e.g., platinum, may be placed between the retort and the precipitator to prevent carry over of any appreciable amount of the particles of reducing agent.

A preferred embodiment of the invention employs fragmented titanium sponge. When titanium sponge is employed, $TiBr_3$ or $TiCl_3$ is produced which is substantially free of any other salts except a small percentage of $TiBr_2$ or $TiCl_2$. For use as a catalyst, the presence of such percentages of $TiBr_2$ or $TiCl_2$ is not objectionable.

The employment of $TiBr_2$ or $TiCl_2$ as the reducing substance for $TiBr_4$ or $TiCl_4$ according to the invention also produces $TiBr_3$ or $TiCl_3$ substantially free of other salts except a small percentage of $TiBr_2$ or $TiCl_2$. However, $TiBr_2$ or $TiCl_2$ being unstable in the presence of moisture requires precautions to exclude moisture therefrom prior to use as the reducing substance.

The employment of Al metal comprises a particularly useful embodiment of the invention since it is less costly than titanium and the end product made viz., a mixture of $TiBr_3$ and $AlBr_3$ when $TiBr_4$ is employed or $TiCl_3$ and $AlCl_3$ when $TiCl_4$ is employed, is useful as a catalyst. If desired, however, the aluminum bromide or chloride may be separated from the $TiBr_3$ or $TiCl_3$ by known methods.

The product made according to the invention is in a finely subdivided state suitable as a catalyst whether it is a mixed salt or substantially all $TiBr_3$ or $TiCl_3$ containing a small percentage of $TiBr_2$ or $TiCl_2$.

The drawing schematically shows an apparatus useful in practicing the invention.

Referring to the drawing in more detail, there is shown inert gas feed pipe 10 which bifurcates into inert gas pipe 12, leading to $TiCl_4$ or $TiBr_4$ chamber 14, and inert gas pipe 16 which by-passes the $TiCl_4$ or $TiBr_4$ chamber. Valve 18 in pipe 12 and valve 20 in pipe 16 provide means for regulating the flow of inert gas. Pipe 12 is secured to nipple 21 which passes through packing 22 and extends to a point near the bottom of 14. Liquid $TiCl_4$ 24 is shown in chamber 14. It is supplied by feed pipe 26 leading from reservoir 28. When $TiBr_4$ is employed, reservoir 28 and chamber 14 are heated by burners 30 and 31 respectively to a temperature above the melting point of $TiBr_4$. Valve 32 provides control of the flow of the $TiCl_4$ or $TiBr_4$ into chamber 14. Thermometer 33 indicates the temperature of the liquid $TiBr_4$ or $TiCl_4$ in 14. Outlet pipe 34 for inert gas intermixed with vaporous $TiCl_4$ or $TiBr_4$ leads from a point near the top of chamber 14. Flowmeters 36 and 38 provide a means for indicating the rate of flow of gas through pipes 16 and 34, respectively.

Pipes 16 and 34 lead into pipe 17. Pressure gauge 39 in pipe 17 indicates therein the total gas pressure. Pipe 17 leads into retort 40 which is removably secured in place by flange and bolt assemblies 41. Retort 40 contains fragmented reducing metal or $TiCl_2$ or $TiBr_2$ 42. Burner 44 provides heat for retort 40. If desired, a sieve 45 of high melting unreactive metal, e.g., platinum, may be inserted near the outlet of retort 40. Nipple 46 leads from retort 40 into electrostatic precipitator 48 and serves as a means for cooling the gas mixture containing the trichloride or tribromide. Exposure of nipple 46 to air at room temperature is usually sufficient but if desired, a blast of cooling air or a cooling coil may be employed to aid in cooling nipple 46.

Precipitator 48 comprises: glass tube 49 with tapered lower end 50 and upper end 51 each provided with central openings therein; plug 52 having a hole through the center thereof fitted into the opening in 51; metal foil 53 wrapped about 49; ground wire 54 attached to foil 53 and leading to ground 55; receptacle 56 for precipitated subdivided titanium tribromide or trichloride, being produced, which is fitted tightly into the opening in 50; gas vent 58; and electrode 60 passing downwardly through the hole in 52 and attached to negative electric line 62, leading from a source of high voltage D.C. (not shown).

The gas being vented at 58 is largely inert gas and unreacted TiBr$_4$ or TiCl$_4$, dependent upon which tetrahalide is being used. If desired, vent 58 may be connected to recycle line 65 which leads back to inert gas feed line 10. The flow of gas through 65 is regulated by valve 66. Pump 68 in line 65 provides impelling force to insure continuous circulation therethrough. Since the recycle gas contains some unreacted TiCl$_4$ or TiBr$_4$ the rate of flow of inert gas through pipe 16 may be increased and that through 12, and hence through chamber 14 and pipe 34, decreased to compensate therefor. The percentage of TiCl$_4$ or TiBr$_4$ in the recycle gas may be determined readily by known means, if its exact percentage is desired. Among such means are the placement of an infra-red analyzer or a spectrometer in the recycle line.

The sizes of the various parts of the apparatus are not highly critical. Retort 40 is conveniently an open-end heat resistant tube, e.g., one of Vycor, ceramic-lined stainless steel, or quartz. The size of the retort is governed by the size of corresponding parts of the apparatus. For small scale operations, one about 3 to 10 inches long and about ½ to 2½ inches in diameter is quite satisfactory.

Electrostatic precipitators are well known in the art of separating finely divided material suspended in a gas. One particularly suitable for the practice of the invention is described in the Journal of Scientific Instruments, volume 31, page 90 (1954), by Young and Morrison. A general discussion of industrial electrostatic precipitators may be found in Chem. and Eng. News, volume 36, No. 9, page 102 (March 2, 1958).

Although A.C. may be employed in the precipitator, it is much preferred that the central electrode be connected to the negative terminal of D.C. The size of the tube of the precipitator will vary according to operating conditions. When the gas entering the tube is of especially high velocity, a longer tube is desirable; a tube of between about 2 and 4 feet in height and between about 3 and 6 inches in diameter is usually used in practicing the invention. The voltage is preferably high, on the order of 10 to 80 kilovolts. Voltages considerably below 10 kilovolts may be employed, but there is a tendency for some of the TiCl$_3$ or TiBr$_3$ to pass out with the inert gas at voltages below about 10 kilovolts. Generally speaking, the greater the velocity of the gas entering the tube of the precipitator and/or the shorter the tube, the higher the voltage recommended. The maximum voltage which may be used is the voltage just below that at which arcing between the central electrode and the tube wall occurs.

Other means than the electrostatic precipitator for separating the condensed TiCl$_3$ or TiBr$_3$ product from the gas stream may be employed. For example, a filter bag or a cyclone separator may be employed.

Since the preferred embodiment of the invention employs fragmented titanium sponge, the method of practicing the invention will be described for titanium sponge.

In carrying out the invention, TiBr$_4$ or TiCl$_4$ is placed in reservoir 28. Fragmented titanium metal sponge is placed in retort 40, the retort fitted into the assembled apparatus, and burner 44 lighted to heat the titanium metal to between 500° and 1000° C. and preferably between about 600° and 800° C. Electric line 62 is connected to a source of negative electricity. When TiBr$_4$ is used, burner 30 is lighted to melt the TiBr$_4$ and burner 31 is lighted to maintain the TiBr$_4$ in a liquid state. Valves 18 and 20 are opened and an inert gas, e.g., argon, is introduced at a pressure greater than 1 atmosphere but less than about 3 atmospheres and preferably about 5 pounds per square inch greater than 1 atmosphere. The flow of inert gas through pipe 16 and of the TiBr$_4$ or the TiCl$_4$ vapor and inert gas through pipe 34, as indicated by flowmeters 36 and 38, is regulated by valves 18 and 20.

When TiCl$_4$ is used, the temperatures of the inert gas and of the TiCl$_4$ are usually at room temperature although any temperature between the melting and boiling points of TiCl$_4$ may be employed. When TiBr$_4$ is used, it is held above its melting point and the inert gas is advantageously heated also, a temperature of about 50°–70° C. being usually employed. The percentage of TiCl$_4$ in the inert gas as it contacts the titanium metal in retort 40 should be between 0.01 and 50 percent by volume, but is preferably between 0.1 and 1.0 percent. Finely subdivided titanium trihalide having a surface area greater than 10 square meters per gram may be readily obtained by passing at least 20,000 cc. of the gas mixture through 1 cc. of the fragmented Ti metal per hour when the tetrahalide content is between 0.1 and 1.0 percent and the temperature of the Ti is greater than 600°. Below 0.1 percent, the rate of reaction is slow and above 1.0 percent some particles sufficiently large to reduce the surface area per unit of weight below 10 meters/gram tend to form. The percentage of TiCl$_4$ or TiBr$_4$ in the argon may be calculated from the values indicated by flowmeters 36 and 38, the total pressure gauge 18 and thermometer 33. The vapor pressure of TiCl$_4$ or TiBr$_4$ over a wide range of temperatures is ascertained by reference to standard tables. Such tables are usually found in a physical chemistry handbook. A particularly convenient table for use of TiCl$_4$ is set out under "Vapor Pressure of Pure Substances," by D. R. Stull in Ind. and Eng. Chem., vol. 39, p. 545 (April 1947).

The following hypothetical example illustrates a method of determining the percentage of TiCl$_4$ in inert gas: Room pressure is 740 mm. of mercury; the total gas pressure at the entrance to retort 40 as shown by gauge 39 is 760 mm. of mercury; the temperature of TiCl$_4$ is 21.3° C. (its vapor pressure then being 10 mm. of mercury); the rate of flow of argon through flowmeter 36 is 9 cubic feet/minute and the gas flow through flowmeter 38 is 1 cubic foot/minute. Under these conditions, the pressure in pipe 17 due to the partial pressure of the TiCl$_4$ will be 1/10 of the TiCl$_4$ pressure in line 34, or 1/10 of 10 mm. which is 1 mm. of pressure. The ratio of the pressures of vaporous TiCl$_4$ to argon is, therefore, 1/760. Since the ratio of the pressures is also the volume percentage ratio, the percentage of TiCl$_4$ in the argon-TiCl$_4$ mixture in pipe 17 is also 1/760 or 0.13 percent by volume. The composition of other mixtures of TiCl$_4$ or TiBr$_4$ and an inert gas may be similarly calculated from the total pressure of the mixture, the vapor pressure of the titanium compound and the flowmeter readings.

The rate of flow of argon and the temperature of the titanium metal in retort 40 should be so regulated that the TiCl$_3$ being formed in retort 40 is swept out of retort 40 about as fast or preferably just as fast as it is being formed. This condiiton is obtained by maintaining the volume of inert gas high in ratio to the volume of titanium metal in retort 40 and by maintaining the temperature of the titanium metal in retort 40 high in relation to the percentage of TiCl$_4$ in the inert gas by means of burner 44. The ratio of the volume of the inert gas per hour to the volume of Ti metal should be at least 20,000 to 1, i.e., 20,000 cc. of argon should pass through 1 cc. of fragmented Ti per hour. The table below sets out recommendations for minimum temperatures of the titanium metal to use for increasing the percentages of TiCl$_4$ in the argon.

TABLE

| Percent TiCl$_4$ in argon: | Minimum temperature of Ti metal, ° C. |
|---|---|
| 0.03 | 500 |
| 1.00 | 600 |
| 10.00 | 700 |
| 50.00 | 800 |

The gas mixture containing the TiCl$_3$ or TiBr$_3$ is cooled by passing it through nipple 46 where the temperature is dropped sufficiently to condense the TiCl$_3$ or TiBr$_3$ which is then held in suspension as a fog or smoke and thereafter separated as finely subdivided particles in precipitator 48 from the remaining gases. It is recommended that the gas mixture leaving retort 40 be cooled to a temperature below about 300° C. but not below the condensation temperature of $TiCl_4$ or $TiBr_4$, as the case may be. The condensation temperature may be observed by the product becoming wet, giving a glistening appearance to the particles. (The condensation temperature of $TiCl_4$, for example, at about 5 mm. is about 10° C.) It is also recommended that the gas mixture from retort 40 be cooled rapidly since the separated particulate product in the precipitator is finer when the cooling is rapid.

To illustrate the practice of the invention, the following examples were run for which an apparatus similar to that shown in the drawing was employed. A control run which was not in accordance with the invention was first made for comparison purposes.

Control Run

About 1.2 cubic inches of fragmented titanium sponge of an average size of about ¼″ along the greatest dimension were placed in retort 40 of quartz glass which was then positioned in the apparatus and heated by means of burner 44 to a temperature of 600° C. Electrode wire 62 was connected to a 20 kilovolt source of D.C. $TiCl_4$ was run into chamber 14 to the level shown by opening valve 32. Argon gas in pipe 10 was admitted into pipes 12 and 16, by opening valves 18 and 20, at a velocity of 0.13 cubic foot/minute as measured by the combined readings of flowmeters 36 and 38. This was about 11,000 cubic feet per hour of argon per cubic foot of titanium sponge in contact with the argon, i.e., the space velocity of the argon in relation to the titanium was about 11,000 volume units/hour. The percent of $TiCl_4$ of the gas mixture in pipe 17 was 1.3 percent by volume. Valves 18 and 20 were so adjusted that the argon in pipe 17 passed over and through the heated Ti sponge in retort 40 forming $TiCl_3$, nearly all of which remained in retort 40 as relatively large crystals. Although the inert gas containing unreacted $TiCl_4$ passed on through nipple 46 where it was cooled to below 300° C. and thence into precipitator 48, only 0.16 gram of the $TiCl_3$ formed was carried into the precipitator whereas 7 grams remained as large crystals in retort 40.

EXAMPLE 1

An example of the invention was then run wherein the control run was repeated except that the velocity of the argon gas was 1 cubic foot/minute and the $TiCl_4$ volume percentage of the gas entering retort 40 was 0.14 percent. This was a space velocity of about 86,000 volume units per hour. The effluent vapors from the retort were cooled to below about 300° C. as it passed through nipple 46 and then led to the precipitator. The operation was continued for a period of 3.5 hours at a retort temperature of 600° C. during which 9 grams of $TiCl_3$ vapor as "smoke" were produced and collected as fine particles in receptacle 56. No large crystals of $TiCl_3$ were formed in retort 40 or collected in receptacle 56. The finely subdivided $TiCl_3$ product had a surface area of 13 square meters/gram as determined by the Brunauer, Emmett, and Teller method as described in Catalysis, volume I, chapter 2, edited by P. H. Emmett. The product collected in receptacle 56 was analyzed and found to contain 31.24 percent Ti (31.06 percent $Ti^{+++}$) and 67.40 percent Cl. The percentage which was unaccounted for was due to the presence of 1.36 percent of Ti metal due to attrition of the Ti sponge in retort 40. Excluding the small percentage of Ti metal, this product was a molar ratio of Cl to Ti of 2.92:1 indicating the presence of some $TiCl_2$ which in no way lessens the value of the product for catalytic purposes. The presence of a small percentage of Ti metal does not in any way affect its catalytic activity.

EXAMPLE 2

The example above was repeated except that the velocity of the argon was increased to 2 cubic feet/minute by throttling valves 18 and 20 without changing the pressure of argon in pipe 10. The percentage of $TiCl_4$ vapor in the argon was 0.18 percent by volume. After 2 hours, 1.87 grams of $TiCl_3$ product were collected in receptacle 56. The surface area of the $TiCl_3$ product produced was 35 square meters/gram.

EXAMPLE 3

Example 1 was repeated except the velocity of the argon gas was 0.22 cubic foot/minute and the $TiCl_4$ volume percentage of the gas entering retort 40 was 0.12 percent. This was a space velocity of the gas mixture of 20,000 cc. of gas to 1 cc. of Ti metal. The run was continued for 2.7 hours at 600° C. 3.9 grams of finely subdivided $TiCl_3$ product were formed and recovered from receptacle 56. It had a surface area of 22 square meters/gram. However, 0.9 gram of product remained in retort 40 as relatively large crystals, which constituted about 19 percent of the total amount of $TiCl_3$ produced or a yield of 81 percent. A yield of only 81 percent of finely subdivided product might be considered acceptable where conditions do not provide a space velocity of gas to solid greater than 20,000 cc./hour. However, this space velocity is considered a minimum and it is recommended that a space velocity which is substantially greater than 20,000 cc./hour be employed as shown in the above examples.

EXAMPLE 4

This example was similar to the examples above except that $TiBr_4$ was employed instead of $TiCl_4$. The $TiBr_4$ was placed in reservoir 28 and melted by means of burner 30. Burner 31 was lighted to maintain the $TiBr_4$ in 14 at about 70° C. Argon gas was employed at a velocity of 0.18 cubic foot/min. It was heated to 50° C. and passed through pipes 12 and 16 and then into 17. The percentage of $TiBr_4$ vapor in the gas mixture in 17 was 0.08 percent by volume. The gas mixture was passed over the Ti metal at 600° C. as in Examples 1 to 3. The gas mixture containing vaporous $TiBr_4$ was cooled to below 300° C. in passing through nipple 46 to form $TiBr_3$ in suspension or "smoke" which was precipitated as finely subdivided solids in 48. After 3 hours, 2 grams of $TiBr_3$ product were formed which had a surface area of 13 square meters/gram. An analysis of the lower valence bromides produced showed a Ti:Br molar ratio of 2.84:1.

EXAMPLE 5

A further example was run employing $TiCl_4$ and argon as in Examples 1 to 3 but substituting 1.2 cubic inches of Al metal pellets in place of Ti sponge. The velocity of the gas mixture was 1 cubic foot per minute. The concentration of the $TiCl_4$ in the argon was 1.3 percent. The reaction was carried out at about 600° C. The rate of reaction was faster than when Ti was employed. There were produced 4.5 grams of a salt mixture consisting essentially of $AlCl_3$ and $TiCl_3$ with a small percentage of $TiCl_2$. The surface area of the mixture was 4 square meters per gram. The particle size was larger than in the above examples due to the higher concentration of $TiCl_4$ in the inert gas.

The examples show that $TiBr_4$ or $TiCl_4$ vapor carried by an inert gas over Ti or Al metal at a space velocity of at least 20,000 cc. of gas mixture to 1 cc. of Ti at 600° C. to form trihalide suspended in the gas mixture, condensing and precipitating the suspended trihalide and recovering the precipitated halide as in an electrostatic precipitator, produces finely subdivided $TiBr_3$ or $TiCl_3$ substantially free from other salts when Ti is employed, or produces $TiBr_3$ or $TiCl_3$ intermixed with $AlCl_3$ when Al metal is employed. Such finely divided $TiCl_3$ product is of premium quality for catalytic uses.

Having described the invention, what is claimed and desired to be protected by Letters Patent is:

1. The method of producing a finely subdivided high purity metal halide catalyst, for the polymerization of olefins, comprising a preponderance of a trihalide selected from the class consisting of $TiBr_3$ and $TiCl_3$ and having a surface area of a least 4 square meters per gram which consists of: passing a gaseous mixture consisting of at least 0.01% and less than 50.0% by volume of a titanium tetrahalide vapor selected from the class consisting of $TiCl_4$, $TiBr_4$, and mixtures thereof and balance inert inert gas through a bed of particulated solid reducing metal selected from the class consisting of aluminum and titanium at between about 500° C. and below the melting point of aluminum metal when aluminum metal is employed and between about 500° C. and about 800° C. when titanium metal is employed as the reducing metal, the space velocity of said inert gas containing the titanium tetrahalide vapor being at least 20,000 volumes of the gas mixture per hour to one volume of the reducing metal, to form the metal trihalide suspended in the inert gas, and thereafter cooling the resulting gaseous mixture containing the metal trihalide to condense the trihalide, and separating the thus condensed metal trihalide from the inert gas and any unreacted titanium tetrahalide.

2. The method of producing a catalytic grade, high purity lower valent titanium halide for use in polymerizing olefins which consists of: passing one stream of a bifurcated inert gas stream through a liquid tetrahalide selected from the class consisting of $TiCl_4$ and $TiBr_4$ and joining the resulting gas stream with the other gas stream to form a titanium tetrahalide-inert gas mixture consisting of at least 0.01% but less than 50.0% by volume of the tetrahalide in said mixture, passing said mixture through a bed of particulated solid titanium metal having a particle size between about 1/16 inch and about 1/2 inch, at a temperature of at least about 500° C. but not over about 700° C., at a space velocity of at least 20,000 volume units of the gas mixture per hour to one volume unit of titanium metal to form lower valent vaporous titanium halide in the inert gas, and thereafter passing the inert gas containing the titanium halide therein through a cooling means to condense the halide therein, and thence into an electrostatic precipitator, provided with an inner negative electrode, at a potential of between 10 and 80 kilovolts, to precipitate the halide as a finely subdivided solid having a surface area of at least 4 square meters per gram and containing a preponderance of trihalide over any dihalide present to provide a molar proportion of not less than about 2.84 to 0.16.

3. A method of producing a catalytic grade titanium trihalide substantially free from any surface contamination and consisting of a preponderance of a titanium trihalide and having a surface area of at least 4 square meters per gram which consists of: passing one stream of a bifurcated inert gas stream through a liquid tetrahalide selected from the class consisting of $TiBr_4$ and $TiCl_4$ and joining the resulting gas stream with the other gas stream to form a gaseous mixture of the titanium tetrahalide and the inert gas consisting of at least 0.01 but less than 1.0% by volume of the tetrahalide in said mixture, passing said mixture through a bed of particulated solid titanium metal having a particle size of between about 1/16 and about 1/2 inch, at a temperature of at least about 500° C. and not over about 700° C., at a space velocity of at least 20,000 volume units of the gaseous mixture per hour to 1 volume unit of the titanium metal to form a vaporous titanium trihalide suspended in the inert gas, and thereafter passing the gas containing the trihalide suspended therein through a cooling means and thence into an electrostatic precipitator provided with an inner negative electrode at a potential of between 10 and 80 kilovolts to precipitate the trihalide.

4. The method of producing catalytic grade lower valent titanium halide for use in polymerizing olefins, which consists of passing a gaseous mixture consisting of an inert gas containing betwen 0.1 and 1.0% by volume of $TiCl_4$ through a bed of fragmented titanium metal at a temperature betwen 500° C. and 600° C. at a space velocity of at least 86,000 cc. of the gaseous mixture per hour to 1 cc. of the titanium metal to form lower valent titanium halide as a vapor in the gaseous mixture, cooling the gaseous mixture to produce a "smoke" consisting of a molar proportion of at least 2.84 $TiCl_3$ to 0.16 $TiCl_2$ and having a surface area of at least about 10 square meters per gram in said gaseous mixture and cooling and passing the thus produced "smoke" into a separation means to recover the catalytic grade lower valent titanium halides from the gaseous mixture.

References Cited in the file of this patent
UNITED STATES PATENTS

| 2,760,857 | Gross et al. | Aug. 28, 1956 |
| 2,785,973 | Gross et al. | Mar. 19, 1957 |
| 2,925,392 | Seelbach et al. | Feb. 16, 1960 |

FOREIGN PATENTS

| 757,873 | Great Britain | Sept. 26, 1956 |